(12) United States Patent
Luck et al.

(10) Patent No.: US 9,844,750 B2
(45) Date of Patent: Dec. 19, 2017

(54) CYCLICAL METHOD OF PRODUCING HIGH-PURITY NITROGEN AND OPTIONALLY A HIGH-PURITY HYDROCARBON FROM A FEEDSTOCK CONTAINING NITROGEN AND A HYDROCARBON

(75) Inventors: Francis Luck, Noisy le Grand (FR); Catherine Leroi, Pau (FR); Alvaro Fernandez, Nivelles (BE); Ana Mafalda Almeida Peixoto Ribeiro, Leca da Palmeira (PT); Joao Carlos Godinho De Faria Dos Santos, Matosinhos (PT); Alirio Egidio Rodrigues, Porto (PT); Jong-San Chang, Jung-gu Daejeon (KR); U-Hwang Lee, Gyeonggi-do (KR); Young Kyu Hwang, Yuseong-gu Daejeon (KR); Jean-Patrick Bonne, Denguin (FR)

(73) Assignees: TOTAL PETROCHEMICALS FRANCE, Courbevoie (FR); UNIVERSIDADE DO PORTO. (UPORTO) FACULDADE DE ENGENHARIA, Porto (PT); KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 309 days.

(21) Appl. No.: 14/413,867

(22) PCT Filed: Jul. 9, 2012

(86) PCT No.: PCT/FR2012/051623
§ 371 (c)(1),
(2), (4) Date: May 27, 2015

(87) PCT Pub. No.: WO2014/009611
PCT Pub. Date: Jan. 16, 2014

(65) Prior Publication Data
US 2015/0258489 A1 Sep. 17, 2015

(51) Int. Cl.
| | | |
|---|---|---|
| B01D 53/047 | (2006.01) |
| C08F 6/00 | (2006.01) |
| C08F 110/06 | (2006.01) |
| C01B 21/04 | (2006.01) |
| C10G 25/03 | (2006.01) |
| C10G 25/12 | (2006.01) |
| C10G 50/00 | (2006.01) |
| B01J 20/22 | (2006.01) |
| C10G 25/00 | (2006.01) |
| C10G 57/02 | (2006.01) |
| B01J 20/28 | (2006.01) |
| B01J 20/34 | (2006.01) |
| C08L 23/10 | (2006.01) |

(52) U.S. Cl.
CPC ........ *B01D 53/0476* (2013.01); *B01J 20/226* (2013.01); *B01J 20/28066* (2013.01); *B01J 20/28073* (2013.01); *B01J 20/3425* (2013.01); *B01J 20/3491* (2013.01); *C01B 21/0455* (2013.01); *C08F 6/005* (2013.01); *C08F 110/06* (2013.01); *C10G 25/003* (2013.01); *C10G 25/12* (2013.01); *C10G 50/00* (2013.01); *C10G 57/02* (2013.01); *B01D 2253/204* (2013.01); *B01D 2256/10* (2013.01); *B01D 2256/24* (2013.01); *B01D 2257/102* (2013.01); *B01D 2257/702* (2013.01); *B01D 2257/7022* (2013.01); *B01D 2259/40001* (2013.01); *B01D 2259/4003* (2013.01); *B01D 2259/403* (2013.01); *B01D 2259/404* (2013.01); *B01D 2259/40022* (2013.01); *B01D 2259/40066* (2013.01); *B01J 2219/00006* (2013.01); *C10G 2300/202* (2013.01)

(58) Field of Classification Search
CPC .......... B01D 53/4076; B01D 2253/204; B01D 2257/102; B01D 2256/24; B01D 2259/4003; B01D 2256/10; C08F 6/005; C08F 110/06
USPC ............................................. 95/103; 528/483
See application file for complete search history.

(56) References Cited

FOREIGN PATENT DOCUMENTS

| EP | 10 302 478 A1 | 4/2003 |
| WO | WO 2009/007436 A1 | 1/2009 |

OTHER PUBLICATIONS

Hervé Leclerc et al: "Infrared study of the influence of reducible iron (iii) metal sites on the adsorption of CO, CO2, propane, propene and propyne in the mesoporous metal-organic framework MIL-100", Physical Chemistry Chemical Physics, vol. 13, No. 24, Jan. 1, 2011 (Jan. 1, 2011), pp. 11748-11756, XP055057974, ISSN: 1463-9076, DOI: 10.1039/c1cp20502a p. 11748 p. 11755, col. 2—p. 11756, col. 1.

*Primary Examiner* — Fred M Teskin
(74) *Attorney, Agent, or Firm* — Patterson Thuente Pedersen, P.A.

(57) ABSTRACT

The invention relates to a cyclical method for producing a nitrogen fraction, the purity of which is greater than or equal to 95 mol %, and a hydrocarbon-enriched fraction from a filler containing nitrogen and a hydrocarbon, said method using a specific class of porous hybrid solids as an adsorbent in a pressure-swing adsorption (PSA) process. The invention also relates to equipment for implementing said method.

15 Claims, 5 Drawing Sheets

CYCLICAL METHOD OF PRODUCING HIGH-PURITY NITROGEN AND OPTIONALLY A HIGH-PURITY HYDROCARBON FROM A FEEDSTOCK CONTAINING NITROGEN AND A HYDROCARBON

RELATED APPLICATIONS

The present application is a National Phase entry of PCT Application No. PCT/FR2012/051623, filed Jul. 9, 2012, said application being hereby incorporated by reference herein in its entirety.

FIELD OF THE INVENTION

The present invention relates to a cyclical process for the production of a nitrogen fraction with a purity of greater than or equal to 95 mol % (2), on the one hand, and of a fraction enriched in hydrocarbon (3), on the other hand, from a feedstock (1) comprising nitrogen and a hydrocarbon, and also to an installation for the implementation of this process.

BACKGROUND OF THE INVENTION

There exist many processes in the energy industry, the refining industry or the petrochemical industry during which a mixture of nitrogen and hydrocarbon(s) is formed. For example, during the production of polypropylene from propylene, nitrogen is used to purify the polymer and in particular in order to entrain the propylene which has not reacted during the polymerization. In general, the propylene also comprises a small fraction of propane.

The mixture of nitrogen and hydrocarbons often cannot be recycled in the process. The mixture is thus incinerated and discharged to the air.

It would thus be desirable to be able to recover in value this mixture of nitrogen and hydrocarbon(s). In particular, it would be desirable to be able to separate the nitrogen from the hydrocarbon(s) and to recover high-purity nitrogen using a system which consumes the least possible energy and which has the highest possible yield. It would also be desirable to be able to recover the hydrocarbons with a high purity and a high yield.

It is possible, for example, to use condensation or membrane techniques or a combination of the two to recover the hydrocarbons. However, the method is expensive and yields are generally low.

The separation techniques also comprise absorption by a chemical solvent (for example amines) or distillation. However, these processes require bulky installations with high operating expenses (OPEX) and capital expenses (CAPEX).

Another solution consists in using solid adsorbents subjected to adsorption and desorption cycles. The desorption stage can be carried out either while reducing the pressure by pressure swing adsorption (PSA) or else while increasing the temperature by temperature swing adsorption (TSA).

Conventional solid adsorbents comprise active charcoal, activated aluminas, silica gels or else other porous metal oxides. However, the adsorption capacity of these adsorbents is insufficient to compete with the industrial processes described above.

SUMMARY OF THE INVENTION

A subject matter of the invention is a cyclical process for the production of nitrogen with a purity of greater than 95 mol % (2), on the one hand, and of a fraction enriched in hydrocarbon (3), on the other hand, from a feedstock (1) comprising nitrogen and a hydrocarbon, said process using a specific class of porous hybrid solids, metal-organic frameworks (MOF), as adsorbent in a pressure swing adsorption (PSA) process.

The process which is a subject matter of the invention makes it possible, starting from a simple and inexpensive installation, to separate a nitrogen/hydrocarbons mixture in order to recover either high-purity nitrogen or, simultaneously, high-purity nitrogen and high-purity hydrocarbons, this being achieved with excellent degrees of recovery.

A subject matter of the invention is more specifically a cyclical process for the production of a nitrogen fraction with a purity ≥95 mol % (2), on the one hand, and of a fraction enriched in hydrocarbon (3), on the other hand, from a feedstock (1) comprising nitrogen and a hydrocarbon, each cycle comprising the following stages:

i) bringing said feedstock (1) into contact with an adsorbent bed provided with a feed end and with a production end and containing a solid adsorbent chosen from porous hybrid solids, said contacting operation being carried out under a pressure $P_1 \geq 0.1$ MPa and a temperature $T_1 \geq 0°$ C.;

ii) recovering, at the production end of the adsorbent bed, a first nitrogen fraction with a purity ≥95 mol % (2);

iii) depressurizing the adsorbent bed cocurrentwise down to a pressure $P_2 < P_1$ where $P_2 \geq 0.1$ MPa, so as to recover, at the production end of the adsorbent bed, a second fraction of nitrogen with a purity ≥95 mol % (2);

iv) depressurizing the adsorbent bed countercurrentwise down to a pressure $P_3 < P_2$ where $0.05$ MPa$\leq P_3 \leq 0.006$ MPa, so as to desorb the hydrocarbons from the bed and to recover, at the feed end of the adsorbent bed, a first fraction enriched in hydrocarbon (3);

v) purging the adsorbent bed countercurrentwise using the nitrogen fraction with a purity ≥95 mol % (2) under the pressure $P_3$, so as to recover, at the feed end of the adsorbent bed, a second fraction enriched in hydrocarbon (3);

vi) repressurizing the adsorbent bed countercurrentwise using the nitrogen with a purity ≥95 mol % (2) or with the feedstock (1) up to the pressure $P_1$;

in which said adsorbent has a dynamic capacity with regard to the hydrocarbon of at least 3 mmol/g between 0.25 MPa and 0.05 MPa at 50° C. and a dynamic capacity with regard to the nitrogen of less than or equal to 0.50 mmol/g between 0.25 MPa and 0.05 MPa at 50° C.

The dynamic capacity of an adsorbent (mmol/g) is defined as being the difference between the amount adsorbed (mmol) per gram of adsorbent and the amount remaining adsorbed (mmol) per gram of adsorbent after the desorption stage. The dynamic capacity is a function of the adsorption isotherms of the various constituents of the feedstock. Ignoring the kinetic effects, the dynamic capacity of a given constituent (in the case in point the nitrogen or the hydrocarbon) can be estimated by the calculation of the difference between the amount adsorbed at the adsorption pressure and the amount desorbed at the desorption pressure for this constituent.

The process which is a subject matter of the present invention uses, as adsorbent, a solid belonging to the family of the porous hybrid solids which is also called metal-organic framework (MOF). Porous hybrid solids are well known to a person skilled in the art. They are composed of inorganic subunits (transition metals, lanthanides, and the like) connected to one another via organic ligands (carboxylates, phosphonates, imidazolates, and the like), thus defining porous crystalline hybrid networks.

The inventors have found, unexpectedly, that porous hybrid solids exhibiting a dynamic capacity as defined above can be used in a pressure swing adsorption (PSA) process to very efficiently separate gaseous mixtures of hydrocarbons and nitrogen.

Preferably, the porous hybrid solid exhibits a dynamic capacity with regard to the hydrocarbon of at least 3.5 mmol/g, preferably of at least 3.8 mmol/g, between 0.25 MPa and 0.05 MPa and a dynamic capacity with regard to the nitrogen of less than or equal to 0.50 mmol/g, preferably of less than or equal to 0.20 mmol/g, between 0.25 MPa and 0.05 MPa.

The porous hybrid solid according to the invention can comprise one of the following metal ions: Mg, Ca, Sr, Ba, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb or Bi, preferably Fe, Cu, Zr or Ti, more preferably Fe.

The porous hybrid solid according to the invention can comprise, as bidentate organic compound, one of the following functional groups: —COOH, —CS$_2$H, —NO$_2$, —B(OH)$_2$, —SO$_3$H, —Si(OH)$_3$, —Ge(OH)$_3$, —Sn(OH)$_3$, —Si(SH)$_4$, —Ge(SH)$_4$, —Sn(SH)$_3$, —PO$_3$H, —AsO$_3$H, —AsO$_4$H, —P(SH)$_3$, —As(SH)$_3$, —CH(RSH)$_2$, —C(RSH)$_3$, —CH(RNH$_2$)$_2$, —C(RNH$_2$)$_3$, —CH(ROH)$_2$, —C(ROH)$_3$, —CH(RCN)$_2$ and —C(RCN)$_3$, where R is preferably an alkylene group having from 1 to 5 carbon atoms or else an aryl group.

Preferably, the porous hybrid solid according to the invention is chosen from MIL-100(Fe), MIL-125(Ti) or MIL-125(Ti)_NH$_2$ or else from Cu-BTC or UiO-66.

The size of the pores of the porous hybrid solid can be between 5 and 30 Å. Preferably, the porous hybrid solid exhibits a specific surface, measured according to the BET method, of between 1000 m$^2$/g and 3000 m$^2$/g and more preferably between 1500 m$^2$/g and 2500 m$^2$/g.

Generally, the porous hybrid solid will have to be activated before beginning the adsorption stage, in particular by thermal dehydration.

According to the present invention, the feed end of the adsorbent bed is defined as being that via which the feedstock (1) comprising the nitrogen and a hydrocarbon is introduced at the time of the adsorption stage. The production end of the adsorbent bed is defined as being that via which the high-purity nitrogen is withdrawn during the adsorption stage.

The feedstock (1) can originate from any process capable of generating a gaseous mixture of nitrogen and hydrocarbon(s), such as, for example, a plant for the production of polypropylene. The process of the invention makes it possible to separate gas mixtures comprising at least 30 mol % of nitrogen and at most 70 mol % of hydrocarbon, preferably at least 70 mol % of nitrogen and at most 30 mol % of hydrocarbon. The feedstock (1) can comprise several hydrocarbons: one present in a predominant amount (for example propylene) and the others being present in a much lower amount (for example propane, ethane, methane, and the like).

The hydrocarbon is preferably a linear or branched alkane or alkene comprising between 1 and 20 carbon atoms, preferably between 1 and 10 carbon atoms and more preferably between 1 and 5 carbon atoms and is more preferably still propane or propylene.

Stages i) to vi) of the process as described above can be carried out by a PSA process, in particular in VPSA (Vacuum Pressure Swing Adsorption) mode. The basic principle of PSA is to take advantage of the ability of the adsorbent to adsorb more impurities at high pressure than at low pressure. Thus, by linking together adsorption and desorption phases, from a high pressure to a low pressure of the cycle, it is possible to carry out a selective separation of the gas molecules. Furthermore, with adsorption units operating in sequence, it is possible to continuously purify the gas to be treated. The installation can thus comprise several beds of adsorbents, for example between 2 and 4 adsorbent beds, preferably 3 adsorbent beds.

Each cycle of the process of the invention comprises the following successive stages:

Stage (i): the feedstock (1) is introduced via the feed end of the adsorbent bed under a pressure $P_1 \geq 0.1$ MPa and a temperature $T_1 \geq 0°$ C. The feedstock (1) thus comes into contact with the porous hybrid solid. Preferably, $P_1$ is between 0.1 MPa and 1 MPa, more preferably between 0.2 MPa and 0.5 MPa and more preferably still equal to approximately 0.25 MPa. Preferably, $T_1$ is between 0° C. and 100° C. and more preferably equal to approximately 50° C. The adsorbent bed can be pressurized using the feedstock (1) or else with nitrogen.

Stage (ii): on passing through the adsorbent bed, the hydrocarbon present in the feedstock (1) is adsorbed on the porous hybrid solid. As the hydrocarbon exhibits a much greater affinity for the porous hybrid solid than that of the nitrogen, bringing the feedstock (1) into contact with the porous hybrid solid results in an enriching of the feedstock (1) in nitrogen. A nitrogen with a purity of greater than or equal to 95 mol % is then recovered at the production end of the adsorbent bed.

The hydrocarbon/nitrogen selectivity under the conditions of stage i) is at least 20 to 50° C. and 0.25 MPa. For example, the propylene/nitrogen selectivity at 0.1 MPa and 50° C. for MIL-100(Fe) is approximately 40. The selectivity is defined by the following formula:

$$\text{Selectivity} = x\text{HC} * y\text{N}_2 / (x\text{N}_2 * y\text{HC})$$

in which:

xHC=Number of moles of hydrocarbon adsorbed/(Number of moles of hydrocarbon adsorbed+Number of moles of nitrogen adsorbed), $x\text{N}_2$=Number of moles of nitrogen adsorbed/(Number of moles of hydrocarbon adsorbed+Number of moles of nitrogen adsorbed), yHC=Number of moles of hydrocarbon in the feedstock/(Number of moles of hydrocarbon in the feedstock+Number of moles of nitrogen in the feedstock), $y\text{N}_2$=Number of moles of nitrogen in the feedstock/(Number of moles of hydrocarbon in the feedstock+Number of moles of nitrogen in the feedstock).

Stage (iii): the adsorbent bed is depressurized cocurrentwise down to a pressure $P_2 < P_1$ where $P_2 \geq 0.1$ MPa, so as to recover, at the production end of the adsorbent bed, a second nitrogen fraction with a purity $\geq 95$ mol % (2). Preferably, $P_2$ is between 0.2 MPa and 0.1 MPa, more preferably between 0.15 MPa and 0.1 MPa and more preferably still equal to approximately 0.1 MPa.

Stage (iv): the adsorbent bed is subsequently depressurized countercurrentwise down to a pressure $P_3 < P_2$ where 0.05 MPa$\leq P_3 \leq$0.006 MPa, so as to desorb the hydrocarbons from the bed and to recover, at the feed end of the adsorbent bed, a first fraction enriched in hydrocarbon (3). This stage is commonly known as blowdown. Preferably, $P_3$ is between 0.05 MPa and 0.01 MPa, more preferably between 0.05 MPa and 0.025 MPa and more preferably still equal to approximately 0.04 MPa. The adsorbent bed can be depressurized using a vacuum system.

On desorbing the hydrocarbon, the porous hybrid solid is thus regenerated.

Stage (v): the adsorbent bed is purged countercurrentwise using the nitrogen fraction with a purity ≥95 mol % (2) under the pressure $P_3$, so as to recover, at the feed end of the adsorbent bed, a second fraction enriched in hydrocarbon (3).

If it is desired to recover in addition a fraction enriched in hydrocarbon (2) with a purity ≥90 mol %, an additional stage is carried out which consists in recycling a portion of the fraction enriched in hydrocarbon (2) in the adsorbent bed via the feed end before carrying out the depressurization stage iv), so as to saturate the bed with hydrocarbon and to recover, on conclusion of stage iv), a fraction enriched in hydrocarbon (2) with a purity ≥90 mol %. This stage is commonly referred to as a rinse stage.

In this case, the depressurization stage iv) is preferably carried out under a pressure $P_3$ of between 0.05 MPa and 0.006 MPa, more preferably between 0.03 MPa and 0.006 MPa, more preferably still between 0.02 MPa and 0.006 MPa and more preferably still at approximately 0.01 MPa. Stage (vi): the adsorbent bed is repressurized countercurrentwise using the nitrogen with a purity ≥95 mol % (2) or with the feedstock (1) up to the pressure $P_1$.

The process of the invention makes it possible to recover a nitrogen with a purity ≥95 mol % with a degree of recovery of greater than or equal to 80%, preferably of greater than or equal to 95%.

If the additional stage consisting in recycling a portion of the fraction enriched in hydrocarbon (2) in the adsorbent bed via the feed end is carried out before carrying out the depressurization stage iv), the process of the invention additionally makes it possible to recover a hydrocarbon with a purity ≥90 mol % and a degree of recovery of greater than or equal to 80%, preferably of greater than or equal to 90%.

In a preferred embodiment, MIL-100(Fe) is used to separate nitrogen from propylene and to recover a high-purity nitrogen by carrying out the stages described above. The adsorption stage i) is preferably carried out between 0.2 MPa and 0.5 MPa, in particular at 0.25 MPa, and at 50° C. The codepressurization stage iii) is preferably carried out between 0.1 and 0.15 MPa, in particular at 0.1 MPa. The blowdown stage iv) and the purge stage v) are preferably carried out between 0.05 and 0.025 MPa, in particular at 0.04 MPa. The repressurization stage vi) is preferably carried out between 0.2 and 0.5 MPa, in particular at 0.25 MPa.

If in addition it is desired to recover high-purity propylene, a portion of the fraction enriched in propylene (2) is advantageously recycled in the adsorbent bed via the feed end before carrying out the depressurization stage iv). In this case, the adsorption stage i) is preferably carried out between 0.2 MPa and 0.5 MPa, in particular at 0.25 MPa, and at 50° C. The codepressurization stage iii) is preferably carried out between 0.1 and 0.15 MPa, in particular at 0.1 MPa. The rinse stage is preferably carried out between 0.1 and 0.15 MPa, in particular at 0.1 MPa. The blowdown stage iv) and the purge stage v) are preferably carried out between 0.02 and 0.006 MPa, in particular at 0.01 MPa. The repressurization stage vi) is preferably carried out between 0.2 and 0.5 MPa, in particular at 0.25 MPa.

Another subject matter of the invention is an installation for the implementation of the process as described above in the specific case of a feedstock (1) comprising propylene and nitrogen.

This installation comprises:
 a polymerization reactor with an inlet which makes it possible to introduce propylene as reactant, said propylene comprising a propane fraction, as well as the other ingredients necessary for the polymerization;
 a gas/solid separator positioned at the outlet of the polymerization reactor which receives the solid polypropylene resulting from the polymerization reaction and also an unreacted propylene/propane mixture, said gas/solid separator additionally comprising:
  an inlet which makes it possible to introduce nitrogen intended to degas the solid polypropylene,
  an outlet (A) for the nitrogen/propylene/propane gas mixture; and
  an outlet (B) for recovering the solid polypropylene;
 at least one adsorbent column chosen from porous hybrid solids, said columns making it possible to receive the nitrogen/propylene/propane gas mixture so as to produce, on the one hand, a nitrogen with a purity ≥95 mol % and, on the other hand, a mixture enriched in propylene and propane.

In addition, the installation can comprise:
 a line which makes it possible to recycle the nitrogen with a purity ≥95 mol % in the separator,
 a line which makes it possible to recycle the mixture enriched in propylene and propane in the adsorbent column, so as to saturate the bed with hydrocarbon and to recover a fraction of propylene and propane with a purity ≥90 mol %,
 a line which makes it possible to recycle said fraction of propylene and propane with a purity ≥95 mol % in the polymerization reactor or else a distillation column in order to separate the propylene from the propane starting from said fraction.

DETAILED DESCRIPTION OF THE DRAWINGS

The examples which follow clarify the invention without limiting the scope thereof.

In the examples which follow, all the pressures are expressed in bar abs. (bar absolute). 1 bar=0.1 MPa.

EXAMPLES: SEPARATION OF NITROGEN AND PROPYLENE USING MIL-100(Fe)

MIL-100(Fe) is an iron(III) trimesate porous hybrid solid with a zeolite MTN topology synthesized at the Korea Research Institute of Chemical Technology (KRICT) (Yoon et al., 2010).

Two batches were tested:
batch 1: cylinders as described below,
batch 2: beads as described below.

1) Example 1: Measurements of Equilibrium and Simulation

Figure 1:
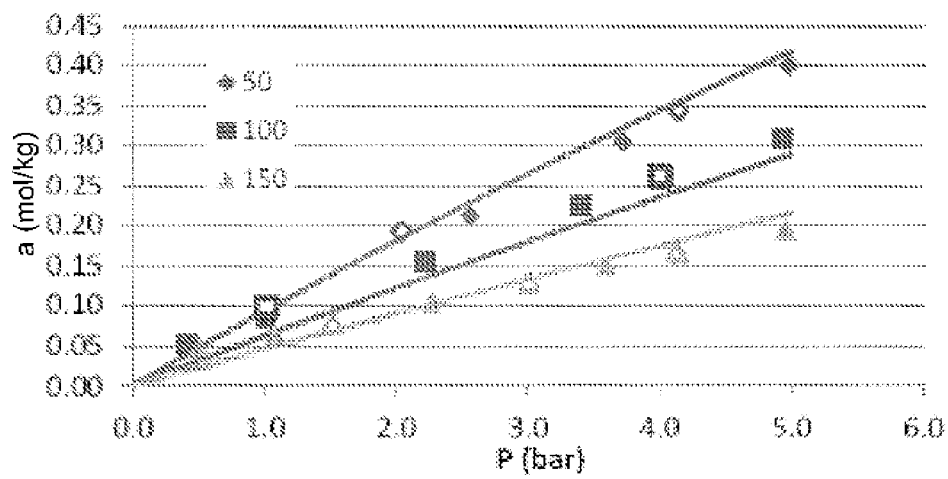
FIG. 1 represents the adsorption isotherms for nitrogen on MIL-100(Fe) at different temperatures (50, 100 and 150° C.), up to 5 bar abs.

FIG. 1 represents the adsorption isotherms for nitrogen on MIL-100(Fe) as characterized in Table 2 at different temperatures (50, 100 and 150° C.), up to 5 bar abs., measured in a Rubotherm magnetic suspension balance.

Figure 2:
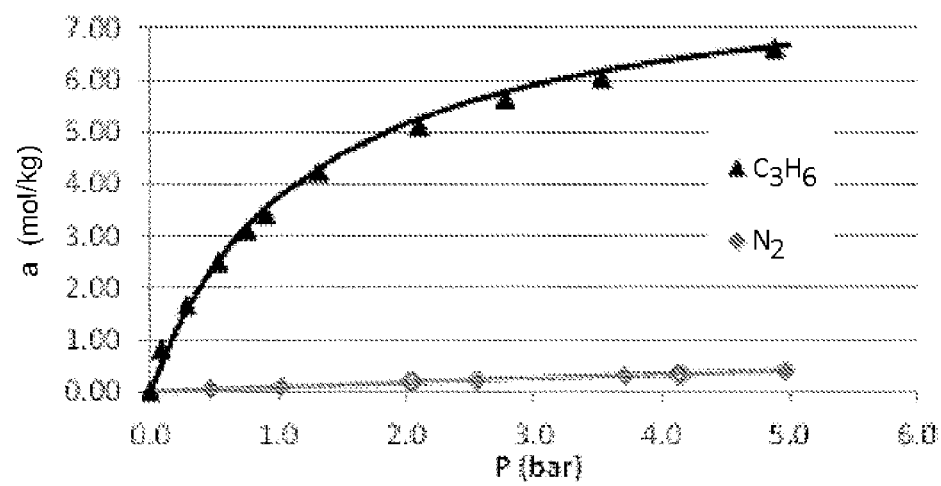
FIG. 2 represents the comparison between the adsorption isotherms for nitrogen and propylene at 50° C. on MIL-100 (Fe).

FIG. 2 represents the comparison between the adsorption isotherms for nitrogen and propylene at 50° C. on MIL-100 (Fe) as characterized in Table 2.

It emerges from these isotherms that the propylene/nitrogen selectivity at 1 bar abs. and 50° C. is approximately 40.

Two cyclical PSA processes were simulated:
A) process for production of high-purity nitrogen from a nitrogen/propylene mixture,
B) process for production of high-purity nitrogen, on the one hand, and of high-purity propylene, on the other hand, from a nitrogen/propylene mixture.

The nitrogen/propylene mixture comprises 70 mol % of nitrogen and 30 mol % of propylene. It is introduced into the adsorbent bed under the following conditions: 70° C., 1 bar abs. and 4 SLPM, 10.7 mol/h. SLPM=Standard Liter Per Min (Standard: 70° F. and 14.696 psiA (21° C. and 1 Atm)).

The process A) comprises the 5 following stages:
the nitrogen/propylene mixture is introduced at the feed end of the adsorbent bed,
adsorption under a pressure of 2.5 bar abs.,
the high-purity nitrogen is recovered at the production end of the adsorbent bed,
cocurrentwise depressurization under a pressure of 1 bar abs., in order to increase the degree of recovery of the nitrogen,
countercurrentwise depressurization (blowdown) under a pressure of 0.4 bar abs., so as to recover a first fraction enriched in propylene, then
a purge under a pressure of 0.4 bar abs. using a fraction of the high-purity nitrogen, in order to regenerate the adsorption bed and to recover a second fraction enriched in propylene,
countercurrentwise repressurization of the adsorbent bed using a fraction of the high-purity nitrogen.

The process B) comprises the same stages as the process A), with in addition a rinse stage which consists in recycling a portion of the fraction enriched in propylene obtained on conclusion of the stage of countercurrentwise depressurization in the adsorbent bed, so as to saturate the latter with propylene and to thus recover a fraction of high-purity propylene. The pressure in the countercurrentwise depressurization stage and in the rinse stage is 0.1 bar abs.

Figures 3, 4:
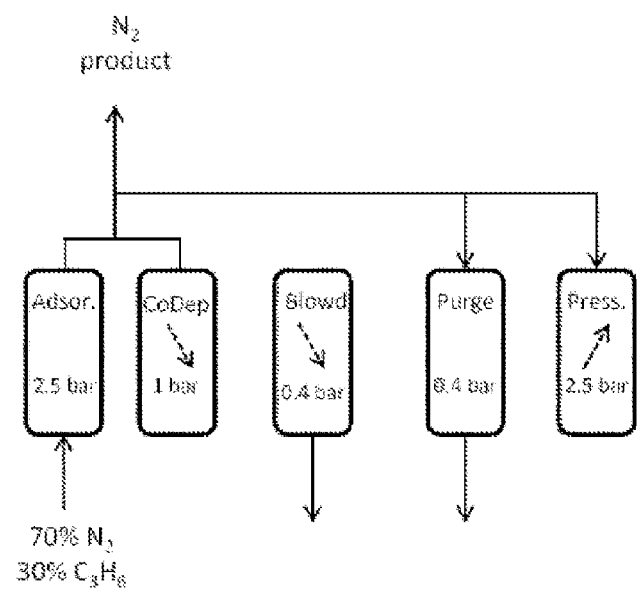
FIG. 3 diagrammatically represents the stages of the cyclical process A) according to the invention.
FIG. 4 diagrammatically represents the cyclical process A) for continuous operation with 4 columns.

FIG. 3 diagrammatically represents the stages of the process A).

FIG. 4 diagrammatically represents the cyclical process A) for continuous operation with 4 columns.

Figures 5, 6:
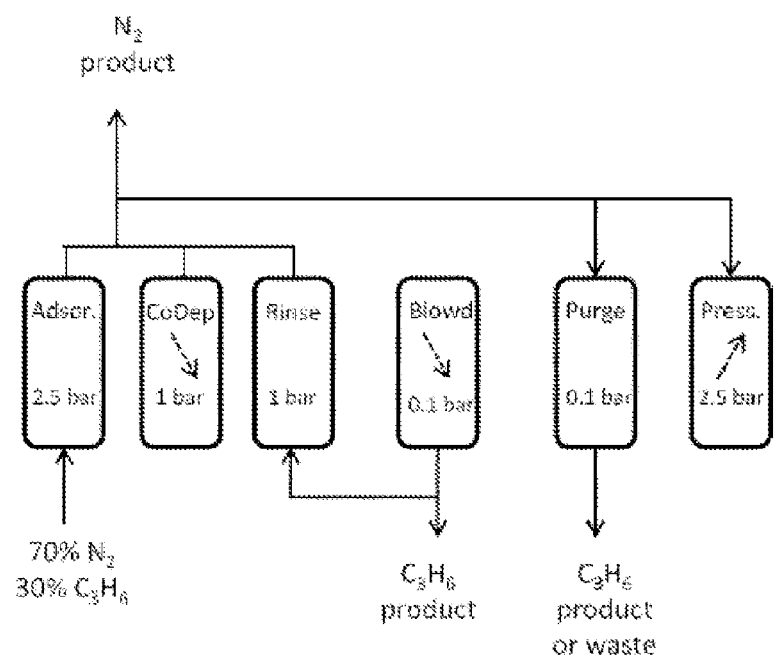
FIG. 5 diagrammatically represents the stages of the process B) according to the invention.
FIG. 6 diagrammatically represents the cyclical process B) for continuous operation with 3 columns.

FIG. 5 diagrammatically represents the stages of the process B).

FIG. 6 diagrammatically represents the cyclical process B) for continuous operation with 3 columns.

The meanings of the expressions used in FIGS. 3, 4, 5 and 6 are shown in the following Table 1:

TABLE 1

| | |
|---|---|
| "Adsor." | Adsorption stage |
| "CoDep" or "CocD" or "D" | Cocurrentwise depressurization stage |
| "Rinse" | Recycling stage (rinse) |
| "Blowdown" or "Blowd" or "B" | Countercurrentwise depressurization stage (blowdown) |
| "Purge" | Countercurrentwise purge stage |
| "Press." or "P" | Countercurrentwise repressurization stage |
| "$N_2$ product" | High-purity nitrogen recovered |
| "$C_3H_6$ product" | High-purity propylene recovered |
| "$C_3H_6$ waste" | Unrecovered propylene fraction |

The mathematical model for carrying out the simulation is that described in Da Silva et al., 1999, Da Silva and Rodriges, 2001, and Ribeiro et al., 2008.

The values of the transport parameters required by the model were calculated by employing the correlations normally used. The axial dispersion coefficients of the mass and of the heat, and also of the mass transfer and convection heat transfer coefficients, were estimated by using the Wakao and Funazkri correlations (Wakao and Funazkri, 1978; Yang, 1987; Da Silva 1999). The coefficient for heat transfer by convection between the gas and the wall of the column was calculated with the Wash and Froment correlation (Wash and Froment, 1972). The macropore diffusivity was calculated with the Bosanquet equation and the diffusivities were determined with the Chapman-Enskog equation (Bird et al., 2002). The general properties of the gases, such as the density, the viscosity and the molar specific heat, were obtained according to Bird et al., 2002. It was assumed that the molar specific heat of the adsorbed gas was equal to that of the gas phase (Sircar, 1985).

The dimensions of the adsorbent bed and the properties of the adsorbent are shown in the following Table 2:

TABLE 2

| | |
|---|---|
| Length of the bed (m) | 2 |
| Diameter of the bed (m) | 0.026 |
| Porosity of the bed | 0.41 |
| Adsorbent | MIL-100(Fe) |
| Form of the adsorbent | cylinders |
| Radius of the cylinder (m) | $1.5 \times 10^{-3}$ |
| Length of the cylinder (m) | $3.85 \times 10^{-3}$ |
| Particle density (kg/m$^3$) | 888 |
| Porosity of the cylinder | 0.34 |
| Crystal diameter | $1.4 \times 10^{-3}$ |

The values of the transport parameters under the feed conditions are shown in the following Table 3:

TABLE 3

| | |
|---|---|
| Axial dispersion coefficient of the mass (m$^2$/s) | $5.5 \times 10^{-4}$ |
| Axial dispersion coefficient of the heat (W/m/K) | 0.50 |
| Mass transfer coefficient of the film (m/s) | $2.3 \times 10^{-2}$ |
| Coefficient for transfer of heat of the film between the gas and the particle (W/m$^2$/K) | 85 |
| Coefficient for transfer of heat of the film between the gas and the wall (W/m$^2$/K) | 60 |

TABLE 3-continued

| | |
|---|---|
| Overall heat transfer coefficient (W/m²/K) | 40 |
| Macropore diffusivity (m²/s) | $C_3H_6$: 3.04 × 10⁻⁶ |
| | $N_2$: 3.07 × 10⁻³ |
| Crystalline diffusivity (m²/s) | $C_3H_6$: 1.18 × 10⁻¹⁰ |
| | $N_2$: 1.13 × 10⁻⁹ |

The energy consumption of the process was also calculated. An adiabatic compression was assumed and the following equation was used:

$$\text{Power} = \frac{1}{\eta} \dot{n} R_g T_1 \frac{\gamma}{\gamma-1}\left(\left(\frac{P_2}{P_1}\right)^{\frac{\gamma-1}{\gamma}} - 1\right)$$

in which:

$\eta$ is the efficiency, $\dot{n}$ is the molar flux, $R_g$ is the ideal gas constant, $T_1$ is the feed temperature, $P_1$ and $P_2$ are respectively the inlet pressure and the outlet pressure and $\gamma$ is the ratio of the heat capacity of the gas mixture at constant pressure to the heat capacity of the gas mixture at a constant volume ($\gamma=Cp/Cv$) (Mc Cabe et al., 1993; McAllister, 2009). For the compression of the feed feedstock from 1 bar abs. to 2.5 bar abs., an efficiency of 85% was set. In the case of vacuum pumps (required for the countercurrentwise depressurization and purge stages), an efficiency of 60% has been assumed.

The performance of the PSA process was evaluated from the following parameters: purity of the product recovered, degree of recovery and productivity as defined by Rota and Wankat (Rota and Wankat et al.).

1.1. Recovery of the High-Purity Nitrogen (Process A):

The purity of the nitrogen is defined in the following way:

$$\frac{n_{N_2}^S(\text{Adsorption}) + n_{N_2}^S(\text{Depressurization})}{n_{Total}^S(\text{Adsorption}) + n_{Total}^S(\text{Depressurization})}$$

in which:

$n_{N_2}^S$ (Adsorption) represents the number of moles of nitrogen exiting in the gas phase during the adsorption stage, $n_{N_2}^S$ (Depressurization) represents the number of moles of nitrogen exiting in the gas phase during the depressurization stage, $n_{Total}^S$ (Adsorption) represents the total number of moles exiting in the gas phase during the adsorption stage, $n_{Total}^S$ (Depressurization) represents the total number of moles exiting in the gas phase during the depressurization stage.

The degree of recovery of the nitrogen is defined in the following way:

$$\frac{n_{N_2}^S(\text{Adsorption}) + n_{N_2}^S(\text{Depressurization}) - n_{N_2}^E(\text{Purge}) - n_{N_2}^E(\text{Pressurization})}{n_{N_2}^E(\text{Adsorption})}$$

in which:

$n_{N_2}^S$ (Adsorption) represents the number of moles of nitrogen exiting in the gas phase during the adsorption stage, $n_{N_2}^S$ (Depressurization) represents the number of moles of nitrogen exiting in the gas phase during the depressurization stage, $n_{N_2}^E$ (Purge) represents the number of moles of nitrogen entering the column during the purge stage, $n_{N_2}^E$ (Pressurization) represents the number of moles of nitrogen entering the column during the repressurization stage, $n_{N_2}^E$ (Adsorption) represents the number of moles of nitrogen entering with the feedstock during the adsorption stage.

The simulation results are shown in the following Table 4:

TABLE 4

| Duration of the stages (s) | | | | |
|---|---|---|---|---|
| Adsorption | Cocurrentwise depressurization | Countercurrentwise depressurization (blowdown) | Purge | Repressurization |
| 300 | 100 | 250 | 500 | 50 |

| P (bar abs.) | P (bar abs.) | P (bar abs.) | Feed T (° C.) |
|---|---|---|---|
| 2.5 | 1.0 | 0.4 | 70 |

| Adsorption flow rate (SLPM) | Purge flow rate (SLPM) |
|---|---|
| 4.0 | 0.24 |

| Nitrogen recovered | | | |
|---|---|---|---|
| Purity (%) | Degree of recovery (%) | Productivity ($mol_{N2}/kg_{ads}/h$) | Fraction enriched in propylene Purity (%) |
| 99.9 | 81.5 | 2.74 | 67.3 |

| Energy consumption |
|---|
| 19.7 W (3.2 $Wh/mol_{N2}$) |

1.2. Recovery of the High-Purity Nitrogen, on the One Hand, and of the High-Purity Propylene, on the Other Hand (Process B):

The purity of the nitrogen is defined in the following way:

$$\frac{n_{N_2}^S(\text{Adsorption}) + n_{N_2}^S(\text{Depressurization}) + n_{N_2}^S(\text{Rinse})}{n_{Total}^S(\text{Adsorption}) + n_{Total}^S(\text{Depressurization}) + n_{Total}^S(\text{Rinse})}$$

$n_{N_2}^S$ (Adsorption) represents the number of moles of nitrogen exiting in the gas phase during the adsorption stage,
$n_{N_2}^S$ (Depressurization) represents the number of moles of nitrogen exiting in the gas phase during the depressurization stage,
$n_{N_2}^S$ (Rinse) represents the number of moles of nitrogen exiting in the gas phase during the rinse stage,
$n_{Total}^S$ (Adsorption) represents the total number of moles exiting in the gas phase during the adsorption stage,
$n_{Total}^S$ (Depressurization) represents the total number of moles exiting in the gas phase during the depressurization stage,
$n_{Total}^S$ (Rinse) represents the total number of moles exiting in the gas phase during the rinse stage.

The purity of the propylene is defined in the following way:

$$\frac{n_{C_3H_6}^S(\text{Blowdown}) + n_{C_3H_6}^S(\text{Purge})}{n_{Total}^S(\text{Blowdown}) + n_{Total}^S(\text{Purge})}$$

in which:
$n_{C_3H_6}^S$ (Blowdown) represents the number of moles of propylene exiting in the gas phase during the countercurrentwise depressurization stage,
$n_{C_3H_6}^S$ (Purge) represents the number of moles of propylene exiting in the gas phase during the purge stage,
$n_{Total}^S$ (Blowdown) represents the total number of moles exiting in the gas phase during the countercurrentwise depressurization stage,
$n_{Total}^S$ (Purge) represents the total number of moles exiting in the gas phase during the purge stage.

The degree of recovery of the nitrogen is defined in the following way:

$$\frac{n_{N_2}^S(\text{Adsorption}) + n_{N_2}^S(\text{Depressurization}) + n_{N_2}^S(\text{Rinse}) - n_{N_2}^E(\text{Purge}) - n_{N_2}^E(\text{Pressurization})}{n_{N_2}^E(\text{Adsorption})}$$

which:
$n_{N_2}^S$ (Adsorption) represents the number of moles of nitrogen exiting in the gas phase during the adsorption stage,
$n_{N_2}^S$ (Depressurization) represents the number of moles of nitrogen exiting in the gas phase during the depressurization stage,
$n_{N_2}^S$ (Rinse) represents the number of moles of nitrogen exiting in the gas phase during the rinse stage,
$n_{N_2}^E$ (Purge) represents the number of moles of nitrogen entering the column during the purge stage,
$n_{N_2}^E$ (Pressurization) represents the number of moles of nitrogen entering the column during the repressurization stage,
$n_{N_2}^E$ (Adsorption) represents the number of moles of nitrogen entering with the feedstock during the adsorption stage.

The degree of recovery of the nitrogen is defined in the following way:

$$\frac{n_{C_3H_6}^S(\text{Blowdown}) + n_{C_3H_6}^S(\text{Purge}) - n_{C_3H_6}^E(\text{Rinse})}{n_{C_3H_6}^E(\text{Adsorption})}$$

in which:
$n_{C_3H_6}^S$ (Blowdown) represents the number of moles of propylene exiting in the gas phase during the countercurrentwise depressurization stage,
$n_{C_3H_6}^S$ (Purge) represents the number of moles of propylene exiting in the gas phase during the purge stage,
$n_{C_3H_6}^E$ (Rinse) represents the number of moles of propylene entering with the feedstock during the rinse stage,
$n_{C_3H_6}^E$ (Adsorption) represents the number of moles of propylene entering with the feedstock during the adsorption stage.

The simulation results are shown in the following Table 5:

TABLE 5

| Duration of the stages (s) | | | | | |
|---|---|---|---|---|---|
| Adsorption | Cocurrentwise depressurization | Rinse | Countercurrentwise depressurization (blowdown) | Purge | Repressurization |
| 800 | 100 | 600 | 250 | 600 | 50 |
| P (bar abs.) | P (bar abs.) | P (bar abs.) | | Feed T (° C.) | |
| 2.5 | 1.0 | 0.1 | | 70 | |
| Adsorption flow rate (SLPM) | | Rinse flow rate (SLPM) | | Purge flow rate (SLPM) | |
| 4.0 | | 1.3 | | 0.17 | |
| Nitrogen recovered | | | Propylene recovered | | |
| Purity (%) | Degree of recovery (%) | Productivity (mol$_{N2}$/kg$_{ads}$/h) | Purity (%) | Degree of recovery (%) | Productivity (mol$_{N2}$/kg$_{ads}$/h) |
| 99.9 | 97.4 | 4.33 | 97.9 | 87.6 | 1.67 |
| Energy consumption | | | | | |
| 36.6 W (5.0 Wh/mol$_{N2}$, 13.0 Wh/mol$_{C3H6}$) | | | | | |

2) Example 2: Experiment at the Pilot Scale

The dynamic adsorption capacity (dynamic capacity) of the MIL-100(Fe) with respect to propylene was determined at 50° C. and 70° C.

Furthermore, adsorption/desorption cycles in VPSA (Vacuum Pressure Swing Adsorption) mode were carried out in order to experimentally confirm the simulation results described above.

2.1. Description of the Pilot Plant

The pilot plant is composed of nitrogen and liquid propylene storage tanks, of a regulator which makes it possible to regulate the nitrogen flow rate, of a positive displacement pump intended for the liquid propylene and of an evaporator located over the mixture, upstream of the adsorption column. The adsorbent (MIL-100(Fe) as described below) bed is placed in the adsorption column with an internal diameter of 1″ and with a height of 2 m. This column is equipped with an external jacket in which a temperature-regulated heat-exchange fluid capable of operating between 20 and 200° C. circulates. Three thermocouples are placed at the bottom, at the middle and at the top of the column, at 0.1 m, 1 m and 1.80 m from the bottom of the adsorbent bed, at the center of the column.

Pressure regulation at the column outlet makes it possible to control the pressure in the column. A vacuum pump is also connected to the column so as to be able to operate under vacuum during the regeneration of the adsorbent. An in-line infrared analyzer makes it possible to analyze the streams at the inlet and on the outlets of the column. Flowmeters are also present at the inlet and at the outlet of the adsorption column.

During the adsorption stage, the liquid propylene is pumped using the positive displacement pump and mixed with the nitrogen. The gas/liquid mixture is then completely vaporized before entering the adsorption column in upward fashion. The stream is controlled using a regulator located on the pump and using a system for regulating the flow rate, and the pressure is controlled using a pressure-regulating loop located after the adsorption column.

The desorption stage is carried out by decreasing the pressure by entrainment under vacuum, a small amount of nitrogen being introduced into the column.

The MIL-100(Fe) tested is provided in the form of beads with a diameter of 2.5 mm and with a specific surface, measured according to the BET method, of greater than 2100 m²/g.

The MIL-100(Fe) has to be activated before use: 3 hours at 150° C. under vacuum of nitrogen. On conclusion of the activation, the loss in weight is approximately 13%, with respect to the initial weight. After each test, the MIL-100 (Fe) was reactivated under these conditions using a slight stream of nitrogen under vacuum (less than 3 mbar).

2.2. Operating Conditions
Temperature: 20-200° C.
Pressure: 0-80 bar

TABLE 6

| Pressure | Minimum | Normal range | Maximum |
|---|---|---|---|
| Adsorption | 1 bar abs. | 1-20 bar abs. | 80 bar abs. |
| Desorption | 0.02 bar abs. | 0.1 bar abs. | 5 bar abs. |

2.3. Sampling and Analysis

The analysis of the various gas streams is carried out in line using three-way valves. These valves make possible the analysis of the mixture at the inlet of the column, of the mixture at the column outlet or of the mixture which passes through the vacuum pump. The analysis is carried out using an analyzer with a platinum-based infrared source (ABB).

2.4. Results 2.4.1 Determination of the Dynamic Capacity of the MIL-100(Fe) with Respect to Propylene at 50° C. And 70° C.

The breakthrough curves and the temperature profiles with regard to MIL-100(Fe) for propylene (feed flow rate: 80 Sl/h±5%) at 50° C. and 1.25 bar abs. were determined. The operating conditions and the amount of propylene adsorbed at equilibrium are shown in Table 7. The dynamic capacity of the MIL-100(Fe) with respect to propylene at 50° C. and 1.25 bar abs. is 4.290 mol/kg.

The breakthrough curves and the temperature profiles with regard to MIL-100(Fe) for propylene (feed flow rate: 80 Sl/h±5%) at 70° C. and 1.28 bar abs. and 2.4 bar abs. were determined. The operating conditions and the amount of propylene adsorbed are shown in Table 8. The dynamic adsorption capacity of the MIL-100(Fe) with respect to propylene at 70° C./1.28 bar abs. and 70° C./2.40 bar abs. is 3.862 mol/kg and 5.387 mol/kg respectively.

TABLE 7

| | | | |
|---|---|---|---|
| Temperature | | | 50° C. |
| Adsorption pressure (bar abs.) | | | 1.25 |
| Adsorption temperature (K) | | | 323 |
| Average volumetric flow at the inlet of the column (Sl · hr) | | | 80 |
| Propylene in the feed feedstock (%) | | | 100 |
| Molar flux at the inlet of the column (mol · s) | | | $9.92 \times 10^{-4}$ |
| Weight of adsorbent in the bed (kg) | | | 0.331 |
| Volume of the adsorbent bed (m³) | | | $1.067 \times 10^{-3}$ |
| True density of the adsorbent (kg/m³) | | | 888 |
| Porosity of the bed ($\epsilon$) | | | 0.65 |
| Diameter (m) | | | 0.02606 |
| Height of the bed (m) | | | 2 |
| | | Position of the sensors | |
| | T | At the bottom | At the middle | At the top |
| | h (m) | 0.10 | 1.00 | 1.80 |
| Adsorbed at equilibrium | Amount of propylene (mol) | | 1.418 |
| | Dynamic capacity (mol/kg) | | 4.290 |

TABLE 8

| | |
|---|---|
| Temperature | 70° C. |
| Adsorption pressure 1 (bar abs.) | 1.28 |
| Adsorption pressure 2 (bar abs.) | 2.40 |
| Adsorption temperature (K) | 343 |
| Average volumetric flow at the inlet of the column (Sl · hr) | 81.3 |
| Propylene in the feed feedstock (%) | 100 |

TABLE 8-continued

| Molar flux at the inlet of the column (mol · s) | 1.01 × 10$^{-3}$ |
| --- | --- |
| Weight of adsorbent in the bed (kg) | 0.331 |
| Volume of the adsorbent bed (m$^3$) | 1.067 × 10$^{-3}$ |
| True density of the adsorbent (kg/m$^3$) | 888 |
| Porosity of the bed ($\epsilon$) | 0.65 |
| Diameter (m) | 0.02606 |
| Height of the bed (m) | 2 |

| | | Position of the sensors | | |
| --- | --- | --- | --- | --- |
| | T | At the bottom | At the middle | At the top |
| | h (m) | 0.10 | 1.00 | 1.80 |
| Equilibrium 1 | Amount of propylene adsorbed (mol) | | 1.276 | |
| | Dynamic capacity (mol/kg) | | 3.862 | |
| Equilibrium 2 | Amount of propylene adsorbed (mol) | | 0.504 | |
| | Dynamic capacity (mol/kg) | | 5.387 | |

Figure 7:
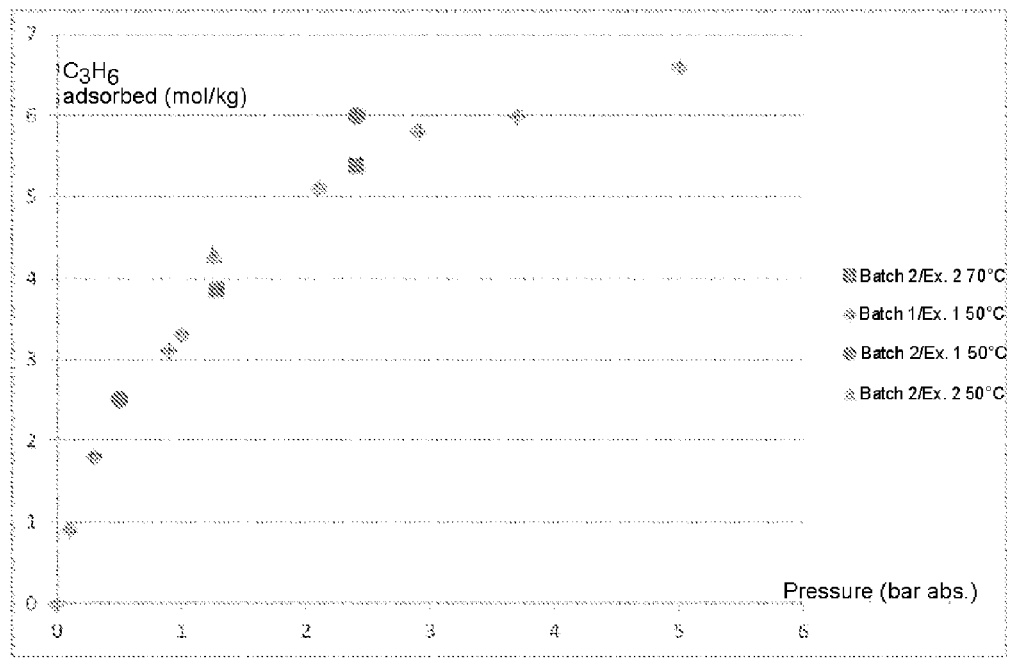
FIG. 7 represents the adsorption capacity of MIL-100(Fe) ("$C_3H_6$ (mol/kg)") as a function of the pressure (Pressure (bar abs.)) at 50° C. or at 70° C., either in the form of cylinders (batch 1) or in the form of beads (batch 2), under the conditions of Example 1 (simulation) or else under the conditions of Example 2 (pilot plant).

FIG. 7 represents the adsorption capacity of the MIL-100 (Fe) ("C$_3$H$_6$ (mol/kg)") as a function of the pressure (pressure (bar abs.)) at 50° C. or at 70° C., either in the form of cylinders (batch 1) or in the form of beads (batch 2), under the conditions of Example 1 (simulation) or else under the conditions of Example 2 (pilot plant).

It can be seen in FIG. 7 that the adsorption capacity of the MIL-100(Fe) with respect to propylene under dynamic conditions (Ex. 2) is very similar to that determined under the static conditions (Ex. 1). The results are uniform.

These results on a pilot plant validate the results obtained by simulation and show that porous hybrid solids, such as MIL-100(Fe), exhibit a dynamic adsorption capacity with respect to hydrocarbons, in particular propylene, which is sufficiently high (at least greater than 3 mmol/g) to make possible efficient separation of the nitrogen within pressure ranges appropriate for an industrial application.

2.4.2 Cycles in VPSA (Vacuum Pressure Swing Adsorption)

Adsorption/desorption cycles in VPSA (Vacuum Pressure Swing Adsorption) mode were carried out in order to experimentally confirm the simulation results of example 1.

Stages:
  adsorption (2.5 bar abs.),
  cocurrentwise depressurization (1.5 bar abs.),
  countercurrentwise depressurization (blowdown) (0.5 bar abs.),
  countercurrentwise purge using 100% pure nitrogen,
  repressurization using 100% pure nitrogen,
  the nitrogen is recovered on conclusion of the adsorption and cocurrentwise depressurization stages.

Operating Conditions:
  adsorption pressure: 2.5 bar abs.
  absorption temperature: 70° C.
  desorption pressure: 0.5 bar abs.
Composition of the feedstock at the inlet of the bed: 70 mol % propylene
  30 mol % nitrogen
Amount of activated MIL-100(Fe) (beads): 330 g The results on a pilot plant in comparison with those obtained by simulation are shown in Table 9:

TABLE 9

| | Unit | Simulation | Pilot plant |
| --- | --- | --- | --- |
| Adsorption time | s | 1180 | 1180 |
| Length of the bed | m | 1.99 | 1.99 |
| Diameter of the bed | m | 0.026 | 0.026 |
| Flow rate of the feedstock | mol/h | 2.68 | 2.68 |
| Flow rate of the purge | SLPM | 0.13 | 0.13 |
| Adsorbent | | MIL-100(Fe) cylinders | MIL-100(Fe) beads |
| Diameter of the adsorbent | m | 0.0015 | 0.0025 |
| Weight of the adsorbent | kg | 0.560 | 0.330 |
| Density of the adsorbent | kg/m$^3$ | 888 | 888 |
| Porosity of the bed | | 0.41 | 0.65 |

The purity of the nitrogen is defined according to the following formula:

$$\frac{n_{N2}^s(\text{Adsorption}) + n_{N2}^s(\text{depressurization})}{n_{Total}^s(\text{Adsorption}) + n_{Total}^s(\text{depressurization})}$$

in which:
  $n_{N2}^s$ (Adsorption) represents the number of moles of nitrogen exiting in the gas phase during the adsorption stage
  $n_{N2}^s$ (depressurization) represents the number of moles of nitrogen exiting in the gas phase during the depressurization stage
  $n_{Total}^s$ (adsorption) represents the total number of moles exiting in the gas phase during the adsorption stage
  $n_{Total}^s$ (depressurization) represents the total number of moles exiting in the gas phase during the depressurization stage.

The degree of recovery of the nitrogen is defined according to the following formula:

$$\frac{n_{N2}^s(Ads) + n_{N2}^s(\text{depressurization})}{n_{N2}^e(Recomp) + n_{N2}^e(Ads) + n_{N2}^e(\text{purge})}$$

in which:
  $n_{N2}^s$ (Ads) represents the number of moles of nitrogen exiting in the gas phase during the adsorption stage
  $n_{N2}^s$ (depressurization) represents the number of moles of nitrogen exiting in the gas phase during the depressurization stage
  $n_{N2}^e$ (Recomp) represents the number of moles of nitrogen entering the column during the recompression stage
  $n_{N2}^e$ (Ads) represents the number of moles of nitrogen entering with the feedstock during the adsorption stage
  $n_{N2}^e$ (purge) represents the number of moles of nitrogen entering the column during the purge stage.

These values are determined over a complete cycle after stabilization of the process.

The purity of nitrogen recovered is 97.6 mol %.
The degree of recovery of the nitrogen is 63.4%.

These results show that porous hybrid solids, such as MIL-100(Fe), exhibit a dynamic adsorption capacity with respect to hydrocarbons, in particular propylene, which is high (at least greater than 3 mmol/g) over pressure ranges appropriate for an industrial application.

Furthermore, these results show that porous hybrid solids, such as MIL-100(Fe), can be used to separate nitrogen from hydrocarbons in a very efficient way, that is to say with very high levels of purity (>95%) and degrees of recovery of greater than 80%, if, in addition, a stage of cocurrentwise depressurization after the adsorption stage and a countercurrentwise purge using high-purity nitrogen as described in example 1 are carried out.

3) Example 3: Measurements of Equilibrium on MIL-125(Ti)_NH$_2$ or UiO-66(Zr)

Figure 8:
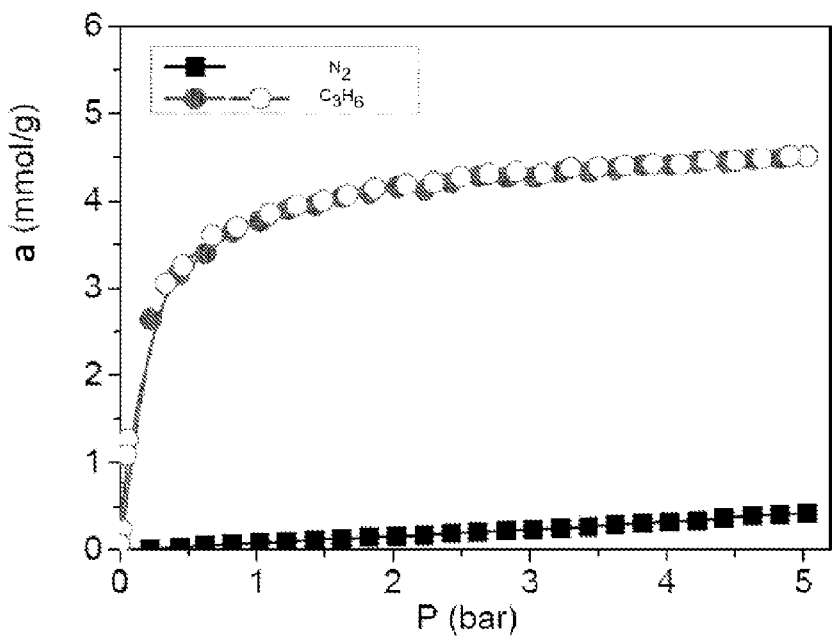
FIG. 8 represents the comparison between the adsorption isotherms for nitrogen and propylene at 70° C. on MIL-125_$NH_2$.

FIG. 8 represents the comparison between the adsorption isotherm for nitrogen and the adsorption isotherm (black points) and desorption isotherm (white points) for propylene at 70° C. over MIL-125(Ti)_NH$_2$, the characteristics of which are shown in the following table 10.

Figure 9:
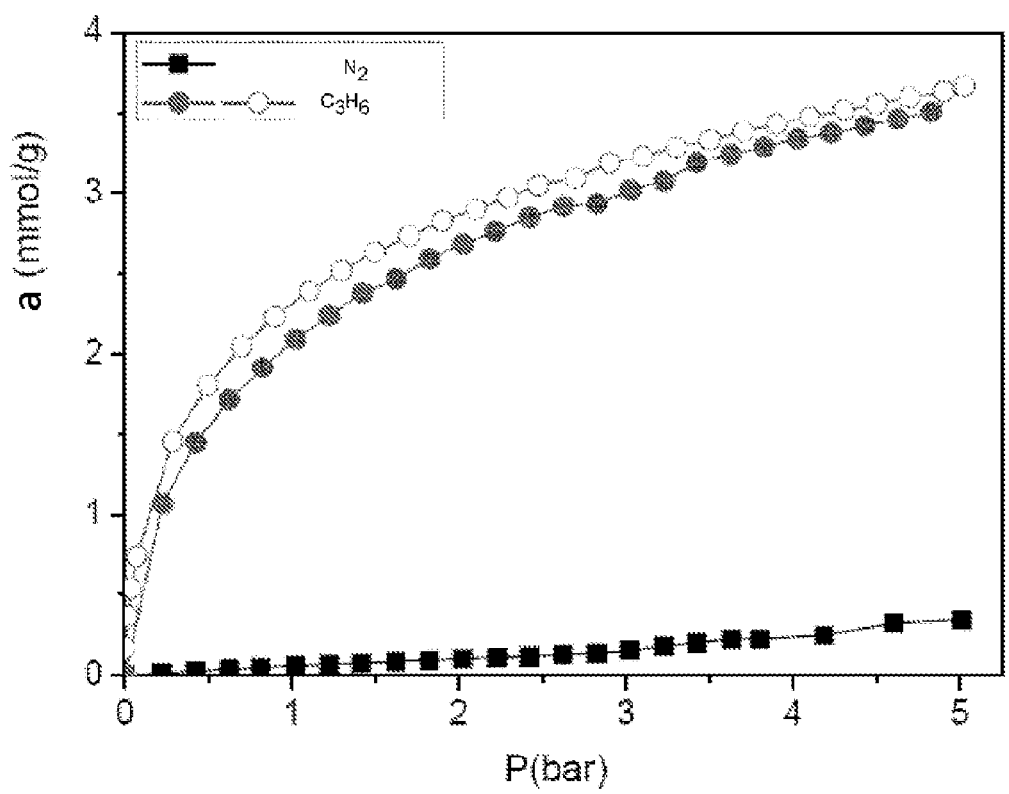
FIG. 9 represents the comparison between the adsorption isotherms for nitrogen and propylene at 70° C. on UiO-66 (Zr).

FIG. 9 represents the comparison between the adsorption isotherm for nitrogen and the adsorption isotherm (black points) and desorption isotherm (white points) for propylene at 70° C. over UiO-66(Zr).

TABLE 10

| | MIL-125 (Ti)_NH$_2$ | UiO-66(Zr) |
|---|---|---|
| Form of the adsorbent | Powder | Powder |
| Porosity | 0.59 cc/g | 0.8 cc/g |
| BET specific surface | 1450 m$^2$/g | 1350 m$^2$/g |

The sorption isotherms were measured using a device of IGA (Intelligent Gravimetric Analyzer, Hiden Analytical Ltd.) type with control of the pressure of the gas (0-5 bar) at 70° C. Before carrying out the adsorption measurements, the samples of adsorbent (30 mg) were dehydrated at 200° C. for 12 hours under vacuum (<10$^{-5}$ torr).

It emerges from these isotherms that the propylene/nitrogen selectivity at 1 bar abs. and 70° C. over MIL-125(Ti)_NH$_2$ is 47.2.

It emerges from these isotherms that the propylene/nitrogen selectivity at 1 bar abs. and 70° C. over UiO-66(Zr) is 33.4.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A cyclical process for the production of a nitrogen fraction with a purity ≥95 mol %, on the one hand, and of a fraction enriched in hydrocarbon, on the other hand, from a feedstock comprising nitrogen and a hydrocarbon, each cycle comprising the following stages:
    i) bringing said feedstock into contact with an adsorbent bed provided with a feed end and with a production end and containing a solid adsorbent chosen from porous hybrid solids, said contacting operation being carried out under a pressure P$_1$≥0.1 MPa and a temperature T$_1$≥0° C.;
    ii) recovering, at the production end of the adsorbent bed, a first nitrogen fraction with a purity ≥95 mol % (2);
    iii) depressurizing the adsorbent bed cocurrentwise down to a pressure P$_2$<P$_1$ where P$_2$≥0.1 MPa, so as to recover, at the production end of the adsorbent bed, a second fraction of nitrogen with a purity ≥95 mol %;
    iv) depressurizing the adsorbent bed countercurrentwise down to a pressure P$_3$<P$_2$ where 0.006 MPa≤P$_3$≤0.05 MPa, so as to desorb the hydrocarbons from the bed and to recover, at the feed end of the adsorbent bed, a first fraction enriched in hydrocarbon
    v) purging the adsorbent bed countercurrentwise using the nitrogen fraction with a purity ≥95 mol % under the pressure P$_3$, so as to recover, at the feed end of the adsorbent bed, a second fraction enriched in hydrocarbon;
    vi) repressurizing the adsorbent bed countercurrentwise using the nitrogen with a purity ≥95 mol % or with the feedstock up to the pressure P$_1$;
    in which said adsorbent has a dynamic capacity with regard to the hydrocarbon of at least 3 mmol/g between 0.25 MPa and 0.05 MPa at 50° C. and a dynamic capacity with regard to the nitrogen of less than or equal to 0.50 mmol/g between 0.25 MPa and 0.05 MPa at 50° C.,
    wherein the hydrocarbon is propylene and the solid adsorbent is MIL 100 (Fe).

2. The process as claimed in claim 1, wherein stage i) of bringing the feedstock into contact with the adsorbent bed is carried out at a pressure P$_1$ of between 0.1 MPa and 1 MPa and at a temperature of between 0° C. and 100° C.

3. The process as claimed in claim 1, wherein the cocurrentwise depressurization stage iii) is carried out at a pressure P$_2$ of between 0.2 MPa and 0.1 MPa.

4. The process as claimed in claim 1, wherein the depressurization stage iv) is carried out under vacuum.

5. The process as claimed in claim 1, wherein the depressurization stage iv) is carried out at a pressure P$_3$ of between 0.01 MPa and 0.05 MPa.

6. The process as claimed in claim 1, wherein, before carrying out the depressurization stage iv), a portion of the fraction enriched in hydrocarbon is recycled in the adsorbent bed via the feed end, so as to saturate the bed with hydrocarbon and to recover, on conclusion of stage iv), a fraction enriched in hydrocarbon with a purity ≥90 mol %.

7. The process as claimed in claim 6, wherein the depressurization stage iv) is carried out under a pressure P$_3$ of between 0.006 MPa and 0.05 MPa.

8. The process as claimed in claim 1, wherein the degree of recovery of nitrogen with a purity ≥95 mol % is greater than or equal to 80%.

9. The process as claimed in claim 6, wherein the degree of recovery of hydrocarbon with a purity ≥90 mol % is greater than or equal to 80%.

10. The process as claimed in claim 1, wherein the feedstock comprises at least 30 mol % of nitrogen and at most 70 mol % of hydrocarbon.

11. The process as claimed in claim 1, wherein the feedstock originates from a plant for the production of polypropylene.

12. A process for the production of polypropylene by polymerization of propylene optionally comprising a propane fraction, in which the polypropylene resulting from the polymerization stage is separated from the propylene and propane which have not reacted during the polymerization using a gas/solid separator into which a nitrogen charge is introduced in order to purify the polypropylene, which results in the formation of a nitrogen/propylene/propane mixture, said process being characterized in that said nitrogen/propylene/propane mixture is recovered and the stages as defined in claim 1 are carried out in order to produce, on the one hand, a nitrogen fraction with a purity ≥95 mol % and, on the other hand, a fraction enriched in propylene and propane.

13. The process as claimed in claim 12, wherein a portion of the fraction enriched in propylene and propane is recycled in the adsorbent bed via the feed end, so as to saturate the bed with hydrocarbon and to recover, on conclusion of stage iv), a fraction enriched in propylene and propane with a purity ≥90 mol %.

14. An installation for the implementation of a process as claimed in claim 12, wherein said installation comprises:
- a polymerization reactor with an inlet which makes it possible to introduce propylene as reactant, said propylene comprising a propane fraction, as well as the other ingredients necessary for the polymerization;
- a gas/solid separator positioned at the outlet of the polymerization reactor which receives the solid polypropylene resulting from the polymerization reaction and also an unreacted propylene/propane mixture, said gas/solid separator additionally comprising:
  - an inlet which makes it possible to introduce nitrogen intended to degas the solid polypropylene,
  - an outlet (A) for the nitrogen/propylene/propane gas mixture; and
  - an outlet (B) for recovering the solid polypropylene;
- at least one adsorbent column chosen from MIL 100 (Fe), said columns making it possible to receive the nitrogen/propylene/propane gas mixture so as to produce, on the one hand, a nitrogen with a purity ≥95 mol % and, on the other hand, a mixture enriched in propylene and propane.

15. The installation as claimed in claim 14, wherein said installation comprises a line which makes it possible to recycle the mixture enriched in propylene and propane in the adsorbent column, so as to saturate the bed with hydrocarbon and to recover a fraction of propylene and propane with a purity ≥90 mol %.

* * * * *